United States Patent [19]

Shimizu et al.

[11] Patent Number: 4,740,907

[45] Date of Patent: Apr. 26, 1988

[54] FULL ADDER CIRCUIT USING DIFFERENTIAL TRANSISTOR PAIRS

[75] Inventors: Shoichi Shimizu, Fujisawa; Yukio Kamatani, Kawasaki; Yasuhiro Sugimoto, Yokohama; Hiroyuki Hara, Tokyo, all of Japan

[73] Assignee: Kabushiki Kaisha Toshiba, Kawasaki, Japan

[21] Appl. No.: 716,090

[22] Filed: Mar. 26, 1985

[30] Foreign Application Priority Data

Mar. 29, 1984 [JP] Japan .................................. 59-61347

[51] Int. Cl.$^4$ ............................................. G06F 7/50
[52] U.S. Cl. ................................................... 364/784
[58] Field of Search ........................ 364/768, 784–788

[56] References Cited

U.S. PATENT DOCUMENTS

| | | | |
|---|---|---|---|
| 3,519,810 | 7/1970 | Priel et al. ........................... | 364/784 |
| 3,906,211 | 9/1975 | Glasser ................................ | 364/786 |
| 3,906,212 | 9/1975 | Poguntke ............................. | 364/784 |
| 3,925,651 | 12/1975 | Miller ................................... | 364/787 |
| 4,215,418 | 7/1980 | Muramatsu ......................... | 364/784 |
| 4,569,032 | 2/1986 | Lee ....................................... | 364/787 |
| 4,583,192 | 4/1986 | Cieslak ................................ | 364/787 |

Primary Examiner—Gary V. Harkcom
Assistant Examiner—Dale M. Shaw
Attorney, Agent, or Firm—Oblon, Fisher, Spivak, McClelland & Maier

[57] ABSTRACT

A high-speed full adder circuit comprising a plurality of differential transistor pairs and operating at multiple logic levels. This full adder can be made up of basic logic circuits, each having differential transistor pairs, such as exclusive-OR circuits, AND circuits and OR circuits. To reduce the chip size of the full adder, while ensuring a high-speed operation, transistors which may be used in common are replaced by a smaller number of transistors, thereby reducing the number of required transistors.

6 Claims, 9 Drawing Sheets

FULL ADDER CIRCUIT USING DIFFERENTIAL TRANSISTOR PAIRS

BACKGROUND OF THE INVENTION

The invention relates to a full adder circuit and, in particular, a full adder circuit of a multiple logical level type using differential transistor pairs.

FIG. 1 shows a full adder circuit substantially similar to that shown in U.S. Pat. No. 3,519,810. This full adder circuit is of a three-input and two-output type using differential paired transistors in a tree-like configuration which is adapted for multiple logical levels. In FIG. 1 $V_{DD}$ and $V_{SS}$ represent a high and a low potential power source, respectively, and A, $\overline{A}$, B, $\overline{B}$, C, $\overline{C}$ show input signals and S, $\overline{S}$ show sum output signals. C', $\overline{C}'$ represent carry output signals and Vb represents a bias power source for a current source. The full adder circuit of FIG. 1 is characterized in that a sum output signal and carry output signal are almost simultaneously output due to the adoption of the multiple logical level circuit arrangement and that an arithmetic operation is carried out at high speed within a one-gate delay time range.

However, this circuit arrangement uses 26 transistors and thus a very great number of elements are required so as to provide a parallel multiplier using such transistors.

SUMMARY OF THE INVENTION

An object of this invention is to provide a full adder circuit using differential transistor pairs which can perform an arithmetic operation at high speed, using a lesser number of elements.

Another object of this invention is to provide a full adder circuit which can reduce a chip occupation area when it is configured as an integral circuit.

Still another object of this invention is to provide a full adder circuit which is low in cost and permits a reduced percentage of failure.

A three-input and multiple logical level type full adder circuit can be comprised of a combination of basic logical circuits, such as exclusive OR circuits, OR circuits and AND circuits, each having paired differential transistors. The full adder circuit basically requires 20 transistors. Two pairs of differential transistors are used for a lowest level input signal and a current source transistor is connected to the respective paired transistors. According to this invention the number of transistors required can be reduced to 17, noting that for the lowest level input one pair of differential transistors is used in place of two pairs of differential transistors and that one current source transistor is employed in place of one pair of current source transistors.

DETAILED DESCRIPTION OF THE PREFERRED EMBODIMENTS

According to this invention, as many transistors as practicable are shared in a multiple logical level type full adder circuit, comprised of a simple combination of basic logical circuits, to reduce the number of elements required. Before describing the full adder circuit of this invention, explanation is made of a full adder circuit, comprised of a combination of basic logical circuits, to obtain a ready understanding of this invention. In this connection, reference is invited to FIGS. 2 to 5.

With input binary digits representing A, B and C, an arithmetic operation is performed on the full adder circuit in the following way:

$$S = A \oplus B \oplus C \ldots \quad (1)$$

$$C' = B \cdot C + C \cdot A + A \cdot B \ldots \quad (2)$$

where S denotes a sum digit and C' denotes a carry digit.

Figure 2:
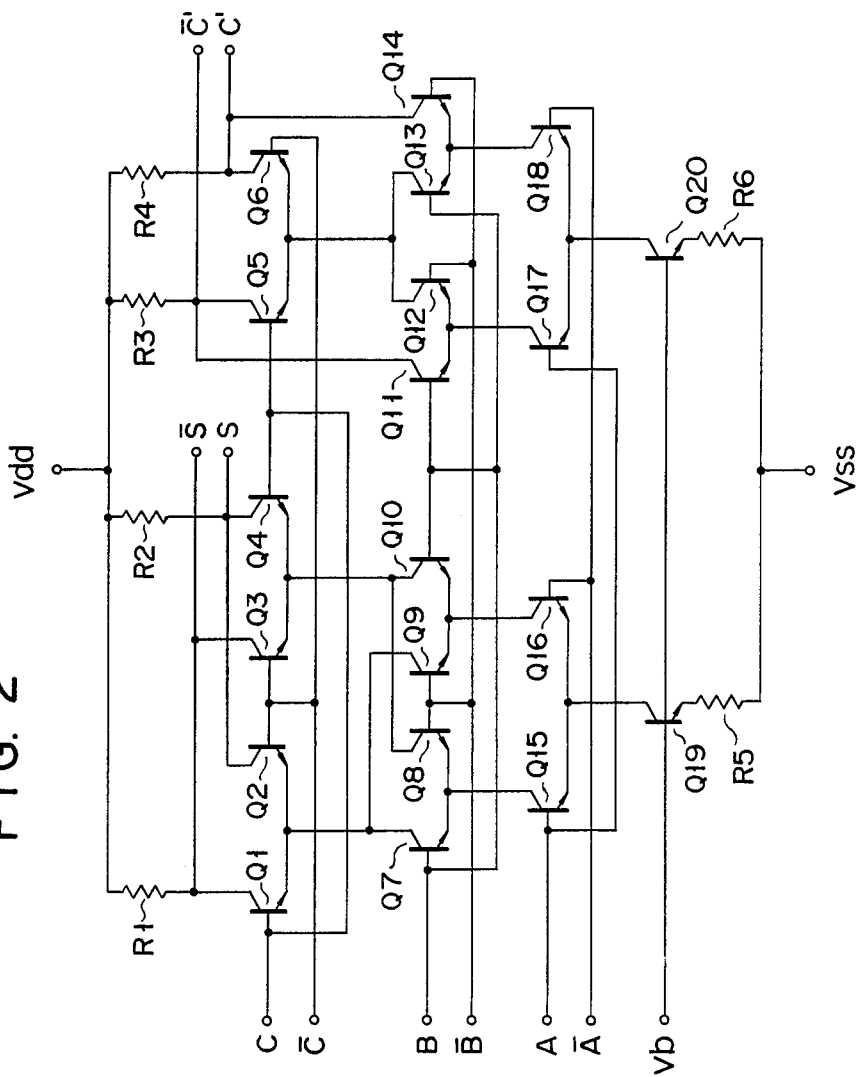
FIG. 2 shows a full adder circuit comprised of basic logical circuits, such as an exclusive OR circuit, AND circuit and OR gate, which include paired differential transistors.
Figure 3:
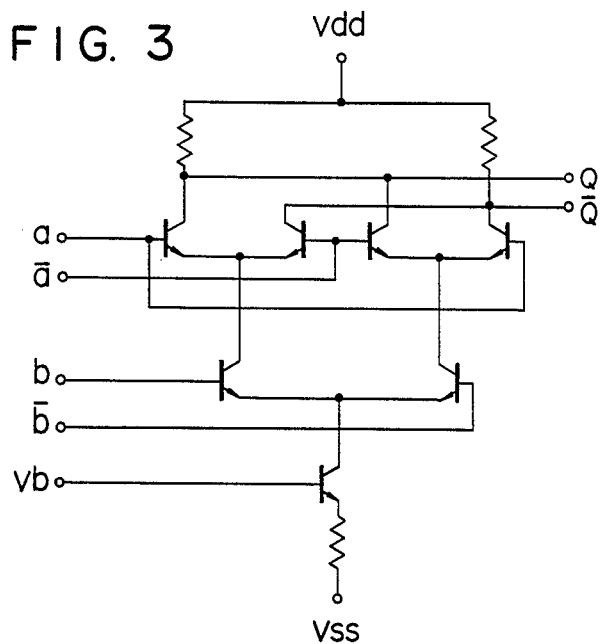
FIG. 3 shows a basic exclusive OR gate as used in FIG. 2.
Figure 4:
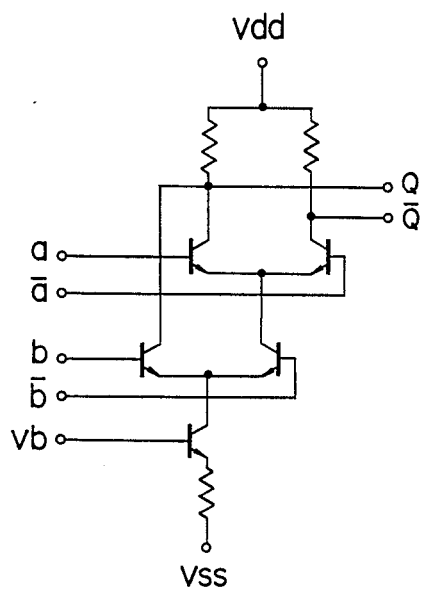
FIG. 4 shows a basic OR circuit as used in FIG. 2.
Figure 5:
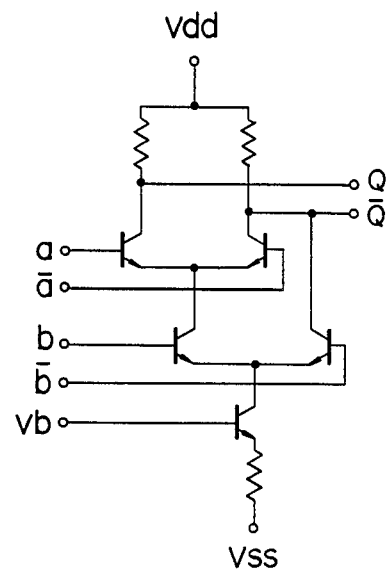
FIG. 5 shows a basic AND circuit as used in FIG. 2.

Thus, the full adder circuit can be made by a combination of exclusive OR circuits, AND circuits and OR circuits. FIG. 2 shows a full adder circuit. FIGS. 3, 4 and 5 show an exclusive OR circuit, OR circuit and AND circuit, respectively, which constitute the full adder circuit. The transistors used in these circuits are of NPN type. Since these basic logical circuits are well known in the art, further description thereof seems unnecessary.

In the full adder circuit shown in FIG. 2 the exclusive OR circuits of FIG. 3 are stacked in two stages above a current source of transistor Q19 and resistor R5.

Figure 1:
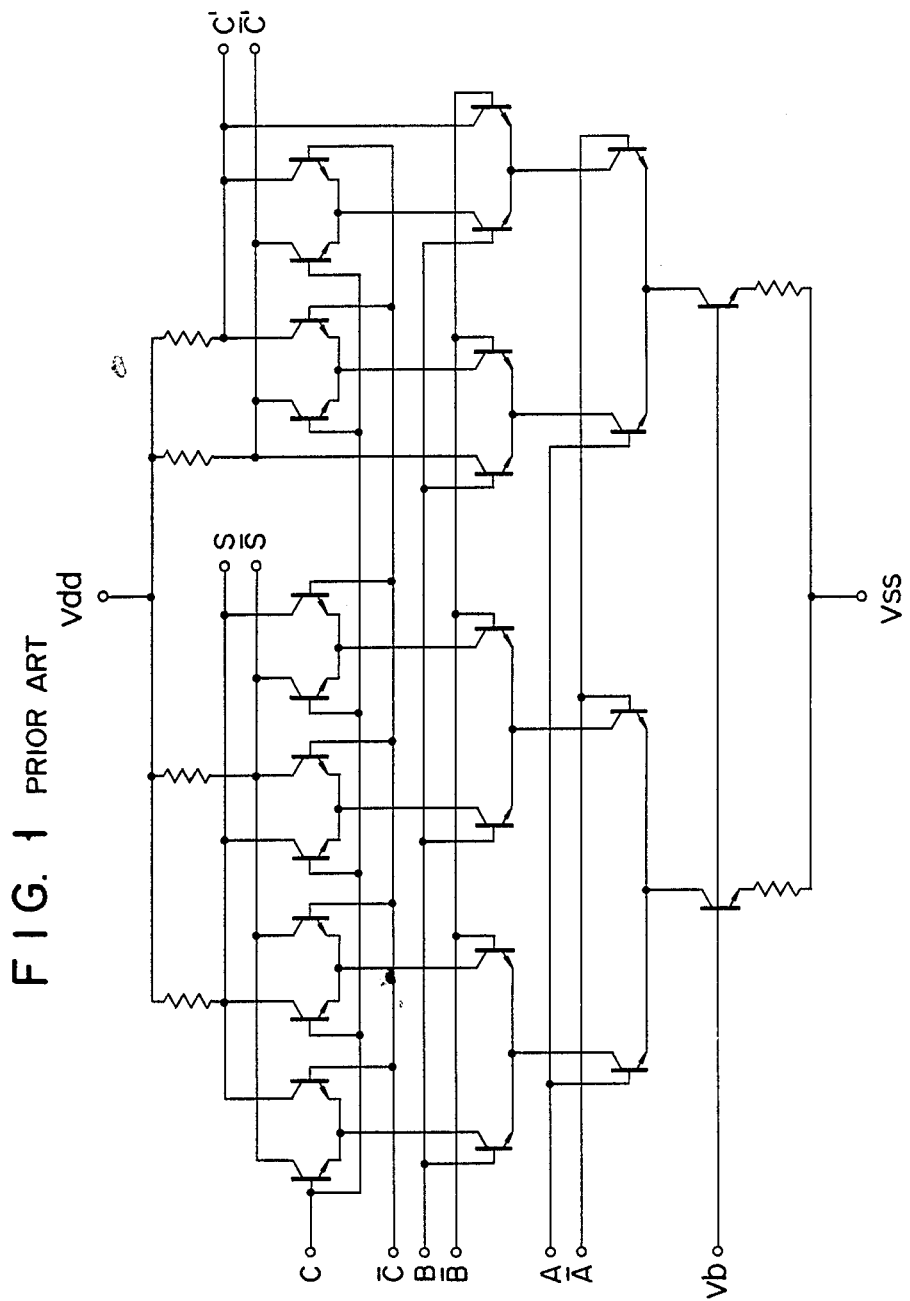
FIG. 1 shows a full adder circuit comprised of conventional differential transistor pairs and adapted to operate at multiple logical levels.

The full adder circuit of FIG. 2 performs an arithmetic operation in the form of:

$$S = (A \oplus B) \oplus C$$

which is a modification of FIG. 1. On the other hand, the circuit above a current source comprised of transistor Q20 and resistor R6 in FIG. 2 shows a combination of OR circuit of FIG. 4 and AND circuit of FIG. 5. For example, the carry digit C' rises to a high voltage level when a current flows through transistors Q11 and Q17 simultaneously, when a current flows through transistors Q5, Q12 and Q17 simultaneously, or when a current flows through transistors Q5, Q13 and Q18 simultaneously. This can be logically expressed in the form:

$$C = A \cdot B + A \cdot \overline{B} \cdot C + \overline{A} \cdot B \cdot C$$

-continued $$= A \cdot B + A \cdot C + B \cdot C$$

This is equivalent to FIG. 2.

The full adder circuit of FIG. 2 uses 20 transistors, which is less than the full adder circuit of FIG. 1. According to this invention, the number of elements required can be reduced through replacement of the shared transistors with a lesser number of transistors. That is, in the full adder circuit of FIG. 2, input signals A and $\overline{A}$ are applied respectively to transistors Q15 and Q16 and respectively to transistors Q17 and Q18. In consequence, the number of elements can be reduced through the replacement of transistors Q15 and Q17 with one transistor and the replacement of transistors Q16 and Q18 with one transistor.

A full adder circuit according to one embodiment of this invention will be described by referring to FIG. 6. In this circuit, identical reference numerals are employed to designate circuit elements corresponding to those shown in FIG. 2.

Figure 6:
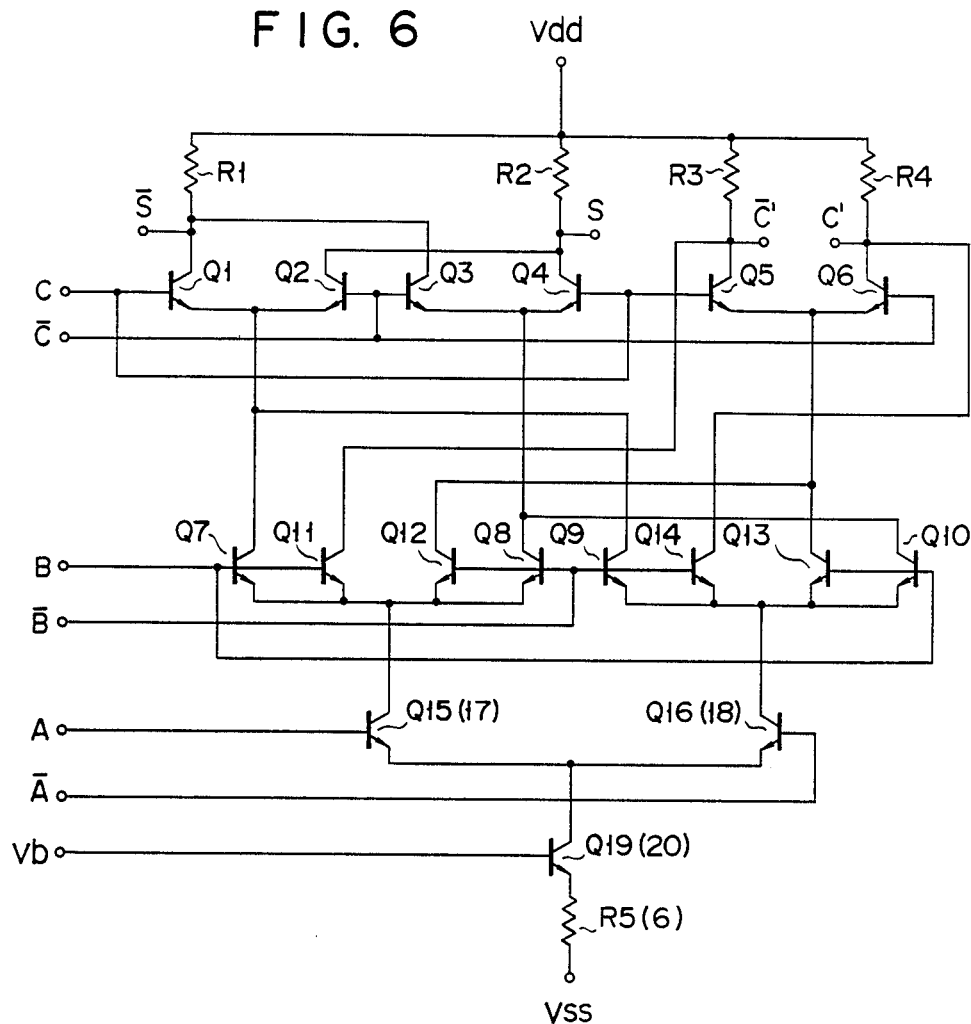
FIG. 6 shows a full adder circuit according to a first embodiment of this invention.

In FIG. 6, first and second transistors Q1 and Q2 are connected at their emitters to each other and at their collectors to a high potential power source $V_{DD}$, respectively through first and second resistors R1 and R2. Similarly, third and fourth transistors Q3 and Q4 are connected at their emitters to each other and at their collectors to power source $V_{DD}$ respectively through the resistors R1 and R2. Fifth and sixth transistors Q5 and Q6 are connected at their emitters to each other and at their collectors to power source $V_{DD}$ respectively through resistors R3 and R4. First to fourth resistors R1 to R4 have an equal resistive value of about 1 kΩ. The bases of first, fourth and fifth transistors Q1, Q4 and Q5 are connected to receive an input signal C and the bases of second, third and sixth transistors Q2, Q3 and Q6 are connected to receive an input signal $\bar{c}$ which is complementary to the input signal C.

Emitter-coupled seventh and eighth transistors Q7 and Q8 have their collectors connected to commonly connected emitters of first and second transistors Q1 and Q2 and to the commonly connected emitters of transistors Q3 and Q4, respectively. Emitter-coupled ninth and tenth transistors Q9 and Q10 have their collectors connected to the commonly connected emitters of transistors Q1 and Q2 and to the commonly connected emitters of transistors Q3 and Q4, respectively. Eleventh and twelfth transistors Q11 and Q12 are connected at their emitters to the emitters of transistors Q7 and Q8. Transistor Q11 is connected at its collector to the collector of transistor Q5. Transistor Q12 is connected at its collector to the commonly connected emitters of transistors Q5 and Q6, and thirteenth and fourteenth transistors Q13 and Q14 are connected at their emitters to the emitters of transistors Q9 and Q10. Transistor Q13 is connected at its collector to the emitters of transistors Q5 and Q6 and transistor Q14 is connected at its collector to the collector of transistor Q6.

The bases of transistors Q7, Q11, Q10 and Q13 are commonly connected to receive an input signal B and the bases of transistors Q8, Q12, Q9 and Q14 are commonly connected to receive an input signal $\overline{B}$ complementary to the input signal B.

Fifteenth and sixteenth transistors Q15 (17) and Q16 (18) are connected at their emitters to a low potential power source $V_{SS}$ through a current source comprised of a transistor Q19 (20) and resistor R5 (6). Transistor Q15 (17) is connected at its collector to the emitters of transistors Q7, Q8, Q11 and Q12 and transistor Q16 (18) is connected at its collector to transistors Q9, Q10, Q13 and Q14. The base of transistor Q15 is connected to receive an input signal A and the base of transistor Q15 is connected to receive an input signal $\overline{A}$ complementary to the input signal A. Transistor Q19 (20) is connected at its base to a bias power source Vb.

In the circuit as set out above, power source $V_{DD}$ is +5 volts, power source $V_{SS}$ is 0 volt and bias power source Vb is 1.5 volts. In this connection it is to be noted that the input signals C, $\overline{C}$ have a logical swing of 4.4 to 5 volts, that the input signals B, $\overline{B}$ have a logical swing of 3.7 to 4.3 volts and that the input signals A and $\overline{A}$ have a logical swing of 3.0 to 3.6 volts. Resistor R(5) has a resistive value of 0.5 kΩ.

The full adder circuit of this embodiment performs an arithmetic operation expressed by Eqs. 1 and 2. According to this invention, 17 transistors are used, which is three less than the number of transistors in the circuit of FIG. 2 and nine less than in the circuit of FIG. 1. Furthermore, the high-speed operation characteristics of the multiple logical level circuit is not impaired.

Figure 7:
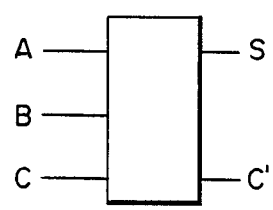
FIG. 7 shows a symbol representation of the full adder circuit of FIG. 6.
Figure 8:
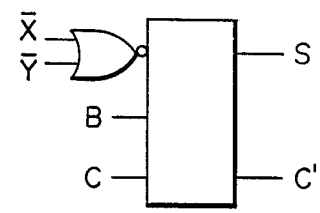
FIG. 8 shows one application of the full adder circuit as shown in FIGS. 6 and 7.

An application of the circuit of FIG. 6 will be described below. FIG. 7 shows a symbol representation of the circuit of FIG. 6. FIG. 8 shows a 4-input adder circuit obtained by provision of one NOR gate at an input of the adder circuit. This practical circuit arrangement is shown in FIG. 9.

That is, NOR gates for $\overline{X}$ and $\overline{Y}$ are connected at A and $\overline{A}$ inputs of FIG. 6. Stated in more detail, input signals $\overline{X}$ and X are applied to the bases of transistors Q15 and Q16, respectively and a pair of differential transistors Q21, Q22 are connected between transistor Q19 and the paired transistors Q15 and Q16. The bases of transistors Q21 and Q22 are connected to receive input signals Y and $\overline{Y}$, respectively. More specifically, transistor Q21 is connected at its collector to the collector of transistor Q15 and transistor Q22 is connected at its collector to the emitters of transistors Q15, Q16.

Figure 9:
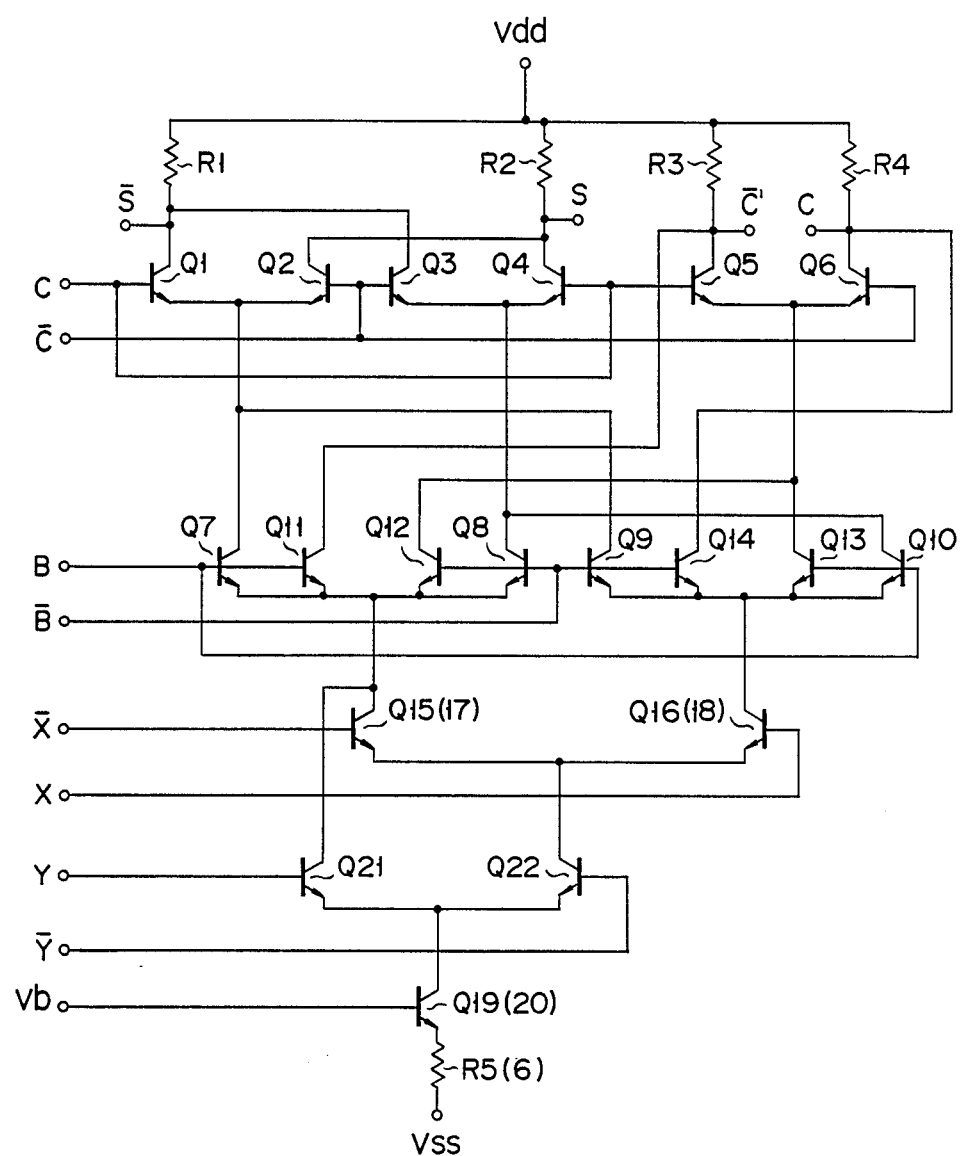
FIG. 9 shows a practical arrangement of FIG. 8.
Figure 10:
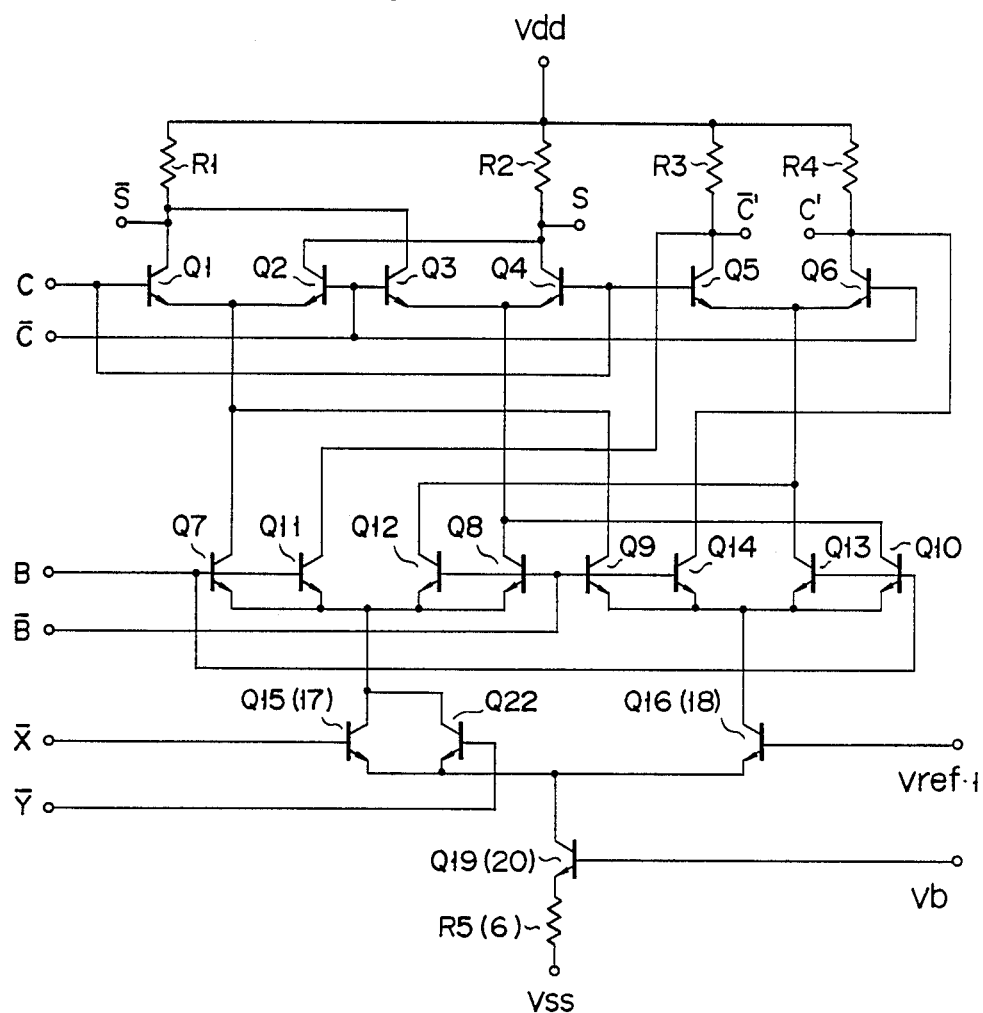
FIG. 10 shows an improved form of arrangement of FIG. 9.

In the circuit of FIG. 9 the logical level of input signals Y and $\overline{Y}$ have to be made smaller than that of the input signals A, $\overline{A}$ in FIG. 6. For example, the input signals Y, $\overline{Y}$ may have a logical swing of 2.3 to 2.9 volts. It may sometimes be difficult to operate when the power source voltage is not adequate. FIG. 10 shows an improved circuit arrangement.

In the circuit shown in FIG. 10, transistors Q22 and Q15 are connected in parallel with each other such that transistor Q22 receives an input signal $\overline{Y}$ at its base and transistor Q15 receives the input signal $\overline{X}$. A reference voltage Vref. 1 of 3.3 volts is applied to the base of transistor Q16. In this circuit, the input signal $\overline{Y}$ may have, like the input signal $\overline{X}$, a logical swing of 3 to 3.6 volts. When either one of the input signals $\overline{X}$, $\overline{Y}$ has a greater magnitude than the reference voltage Vref. 1, transistors Q7, Q11, Q12 and Q8 are selected to achieve the same logical operation as in FIG. 9. In spite of a multi-stage stacked-up arrangement as shown in FIG. 6 it is still possible to perform a complex logical function.

Figure 11:
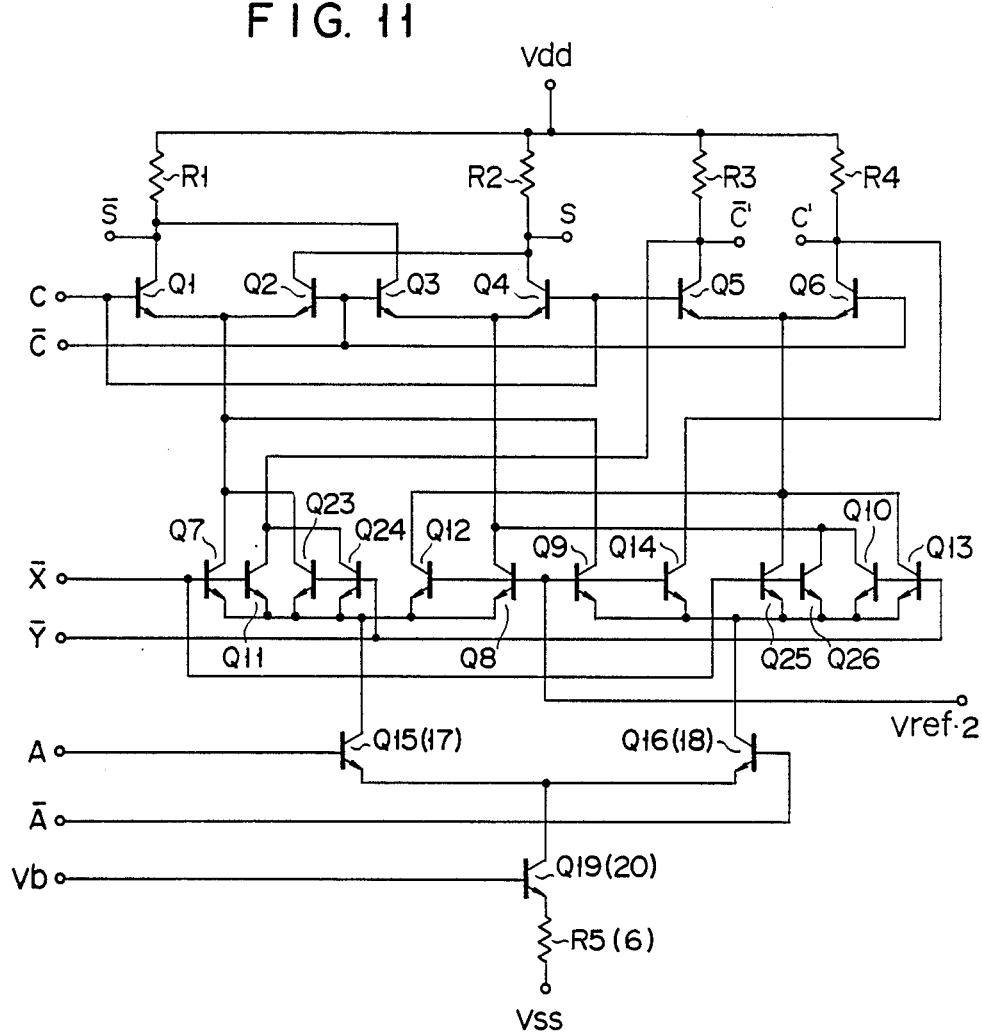
FIG. 11 shows a circuit equivalent in operation to that of FIG. 10.

FIG. 11 shows a circuit, equivalent to that shown in FIG. 10, which is obtained by incorporating NOR gates for inputs $\overline{X}$, $\overline{Y}$ at the inputs B, $\overline{B}$. In this circuit, a combination of transistors Q7 and Q11 is connected in parallel with a combination of transistors Q23, and Q24 and a combination of transistors Q26 and Q25 is connected in parallel with a combination of transistors Q10 and Q13. A reference voltage of 4 volts is applied to the bases of transistors Q12, Q8, Q9 and Q14. The input $\overline{X}$ is applied to the bases of transistors Q7, Q11, Q25 and Q26 and the input $\overline{Y}$ is applied to the bases of transistors Q23, Q24, Q10 and Q13. This circuit requires more transistors than those of the circuit of FIG. 10, but a better performance is obtained due to the symmetrical configuration.

Figure 12:
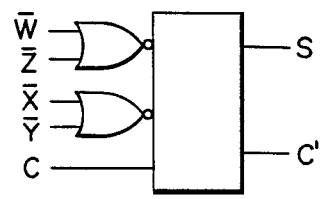
FIG. 12 shows another applied form of this invention.
Figure 13:
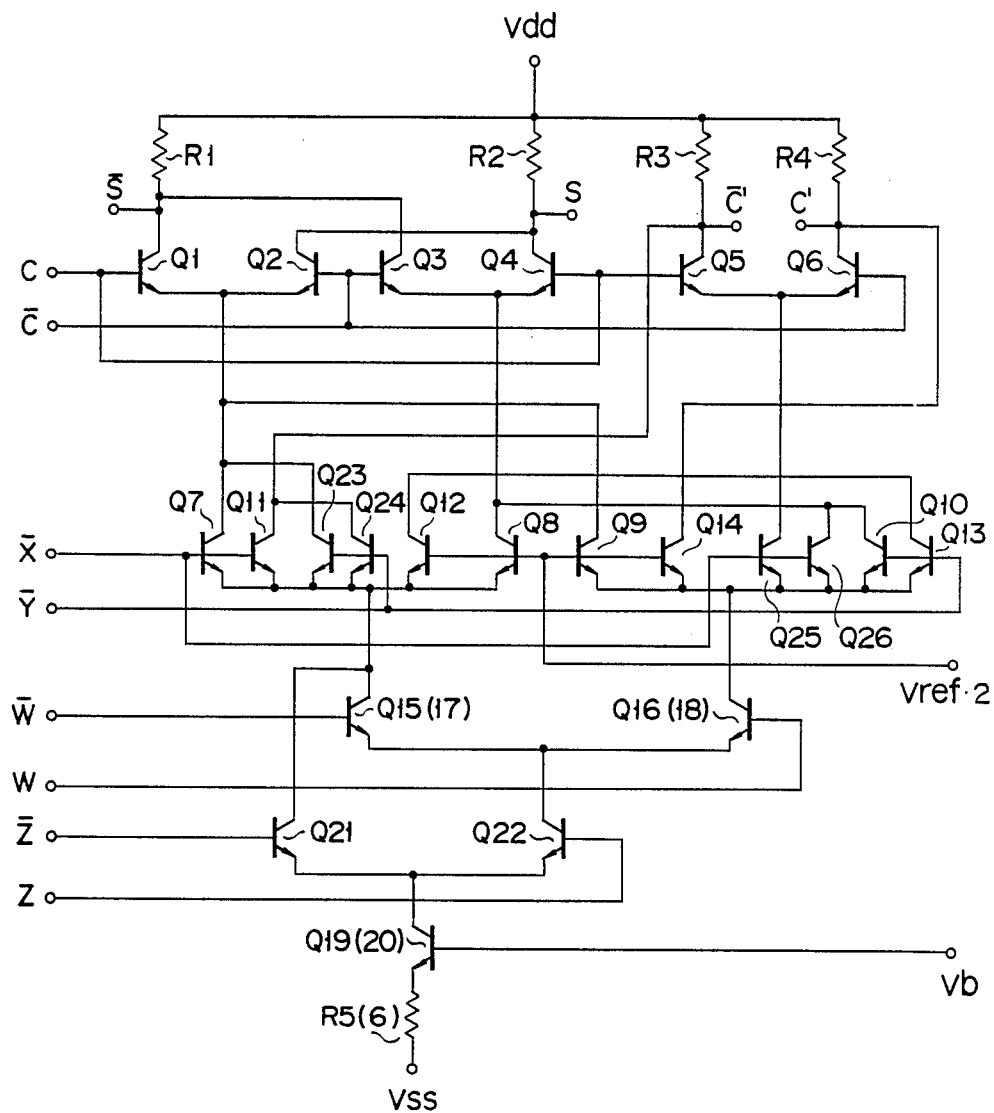
FIG. 13 shows a practical arrangement of FIG. 12.
Figure 14:
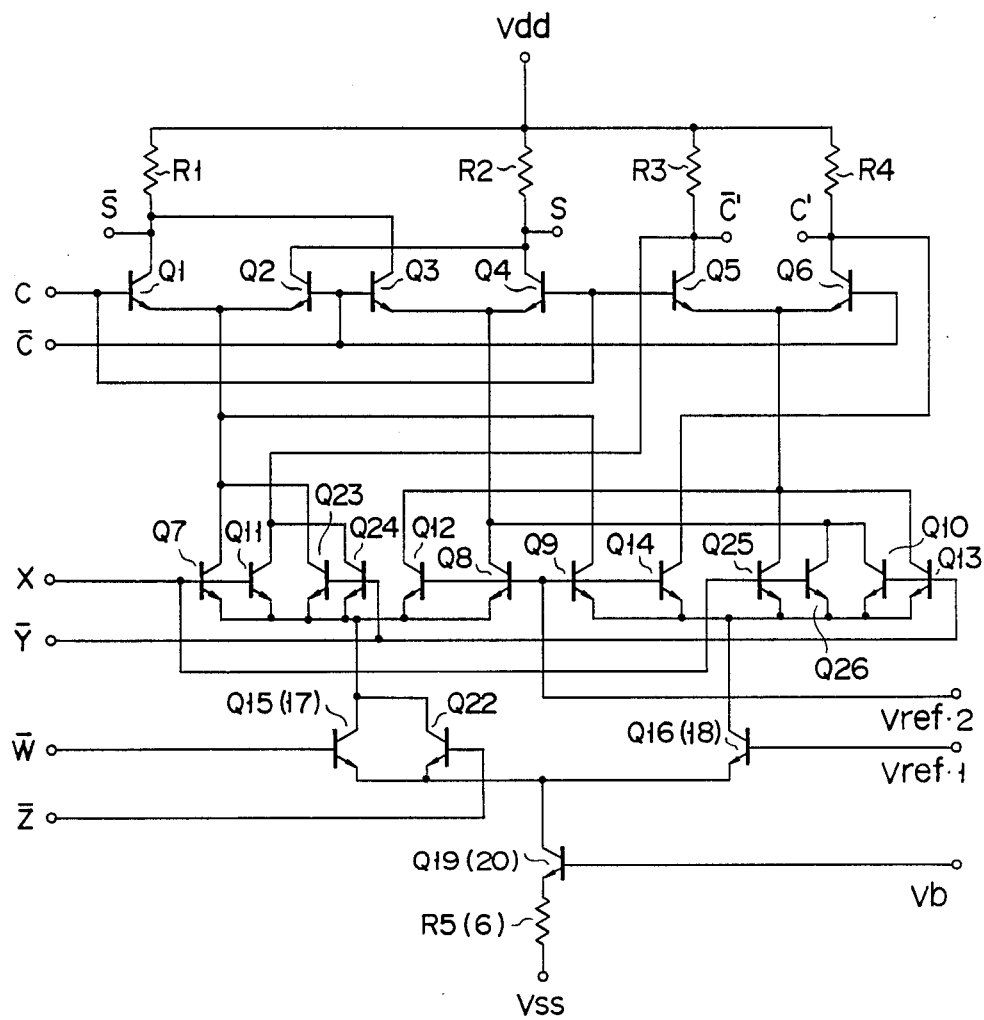
FIG. 14 shows a combination of the circuits of FIGS. 10 and 11.

FIG. 12 shows a full adder circuit having two NOR gate circuits incorporated, the practical circuit of which is shown in FIG. 13. From this it is appreciated that this circuit is comprised of a combination of the circuits of FIGS. 9 and 11. Another applied form of circuit is shown in FIG. 14 which corresponds to a combination of circuits of FIGS. 10 and 11.

Although the full adder circuit using NPN transistors has been described above, it may be possible to employ PNP transistors or GaAs MOSFETs.

What is claimed is:

1. A full adder circuit using paired differential transistors each having a base, emitter and collector, comprising:
   first and second power source terminals across which is applied an operation voltage;
   a first differential transistor pair of first and second transistors having their emitters commonly connected;
   a second differential transistor pair of third and fourth transistors having their emitters commonly connected, and their collectors connected to the collectors of said first and second transistors, respectively;
   a third differential transistor pair of fifth and sixth transistors having their emitters commonly connected;
   a first resistor connected between said first power source terminal and the collectors of said first and third transistors;
   a second resistor connected between said first power source terminal and the collectors of said second and fourth transistors;
   a third resistor connected between the collector of said fifth transistor and said first power source terminal;
   a fourth resistor connected between said power source terminal and the collector of said sixth transistor;
   means for applying a first input signal to the bases of said first, fourth and fifth transistors;
   means for applying a second input signal, complementary to the first input signal, to the bases of said second, third and sixth transistors;
   a fourth differential transistor pair of seventh and eighth transistors having their emitters commonly connected, and their collectors connected to the commonly connected emitters of said first and second transistors and to the commonly connected emitters of said third and fourth transistors, respectively;
   a fifth differential transistor pair of ninth and tenth transistors having their emitters commonly connected, and their collectors connected to the commonly connected emitters of said first and second transistors and to the commonly connected emitters of said third and fourth transistors, respectively;
   a sixth differential transistor pair of eleventh and twelfth transistors having their emitters commonly connected to the commonly connected emitters of said seventh and eighth transistors, and their emitters connected to the collector of said fifth transistor, and to the commonly connected emitters of said fifth and sixth transistors, respectively;
   a seventh differential transistor pair of thirteenth and fourteenth transistors having their emitters commonly connected to the commonly connected emitters of said ninth and tenth transistors, and their collectors connected to the commonly connected emitters of said fifth and sixth transistors, and to the collector of said sixth transistor, respectively;
   means for applying a third input signal to the bases of said seventh, tenth, eleventh and thirteenth transistors;
   means for applying a fourth input signal, complementary to the third input signal, to the bases of said eighth, ninth, twelfth and fourteenth transistors;
   an eighth differential transistor pair of fifteenth and sixteenth transistors having their emitters commonly connected, and their collectors connected to the commonly connected emitters of said seventh and eighth transistors and to the commonly connected emitters of said ninth and tenth transistors;
   means for applying a fifth input signal to the base of said fifteenth transistor;
   means for applying a sixth input signal, complementary to the fifth input signal, to the base of said sixteenth transistor; and
   a current source connected between said second power source terminal and the commonly connected emitters of said fifteenth and sixteenth transistors.

2. A full adder circuit according to claim 1, further comprising:
   a ninth differential transistor pair, connected between said current source and the commonly connected emitters of said fifteenth and sixteenth transistors, of seventeenth and eighteenth transistors having their emitters commonly connected, and their collectors connected to the collector of said fifteenth transistor and to the commonly connected emitters of said fifteenth and sixteenth transistors;
   means for applying a seventh input signal to the base of said seventeenth transistor; and
   means for applying an eighth input signal, complementary to the seventh input signal, to the base of said eighteenth transistor.

3. A full adder circuit using paired differential transistors each having a base, emitter and collector, comprising:
   first and second power source terminals across which is applied an operation voltage;
   a first differential transistor pair of first and second transistors having their emitters commonly connected;
   a second differential transistor pair of third and fourth transistors having their emitters commonly connected, and their collectors connected to the collectors of said first and second transistors, respectively;
   a third differential transistor pair of fifth and sixth transistors having their emitters commonly connected;
   a first resistor connected between said first power source terminal and the collectors of said first and third transistors;

a second resistor connected between said first power source terminal and the collectors of said second and fourth transistors;

a third resistor connected between the collector of said fifth transistor and said first power source terminal;

a fourth resistor connected between said power source terminal and the collector of said sixth transistor;

means for applying a first input signal to the bases of said first, fourth and fifth transistors;

means for applying a second input signal, complementary to the first input signal, to the bases of said second, third and sixth transistors;

a fourth differential transistor pair of seventh and eighth transistors having their emitters commonly connected, and their collectors connected to the commonly connected emitters of said first and second transistors and to the commonly connected emitters of said third and fourth transistors;

a fifth differential transistor pair of ninth and tenth transistors having their emitters commonly connected, and their collectors connected to the commonly connected emitters of said first and second transistors and to the commonly connected emitters of said third and fourth transistors;

a sixth differential transistor pair of eleventh and twelfth transistors having their emitters connected to the emitters of said seventh and eighth transistors, and their collectors connected to the collector of said fifth transistor and to the commonly connected emitters of said fifth and sixth transistors;

a seventh differential transistor pair of thirteenth and fourteenth transistors having their emitters commonly connected to the emitters of said ninth and tenth transistors, and their collectors connected to the commonly connected emitters of said fifth and sixth transistors and to the collector of said sixth transistor;

means for applying a third input signal to the bases of said seventh, tenth, eleventh and thirteenth transistors;

means for applying a fourth input signal, complementary to said third input signal, to the bases of said eighth, ninth, twelfth and fourteenth transistors;

an eighth differential transistor pair of fifteenth and sixteenth transistors having their emitters commonly connected and their collectors connected to the commonly connected emitters of said seventh and eighth transistors and to the common connected emitters of said ninth and tenth transistors;

means for applying a fifth input signal to the base of said fifteenth transistor;

means for applying a first reference voltage to the base of said sixteenth transistor;

a seventeenth transistor having its collector and emitter connected to the collector and emitter of said fifteenth transistor;

means for applying a sixth input signal to the base of said seventeenth transistor; and a current source connected between the emitter of said sixteenth transistor and said second power source terminal.

4. A full adder circuit using paired differential transistors each having a base, emitter and collector, comprising:

first and second power source terminals across which is applied an operation voltage;

a first differential transistor pair of first and second transistors having their emitters commonly connected;

a second differential transistor pair of third and fourth transistors having their emitters commonly connected, and their collectors connected to the collectors of said first and second transistors;

a third differential transistor pair of fifth and sixth transistors having their emitters commonly connected;

a first resistor connected between said first power source terminal and the collectors of said first and third transistors;

a second resistor connected between said first power source terminal and the collectors of said second and fourth transistors;

a third resistor connected between the collector of said fifth transistor and said first power source terminal;

a fourth resistor connected between said first power source terminal and the collector of said sixth transistor;

means for applying a first input signal to the bases of said first, fourth and fifth transistors;

means for applying a second input signal, complementary to said first input signal, to the bases of said second, third and sixth transistors;

a fourth differential transistor pair of seventh and eighth transistors having their emitters commonly connected, and their collectors connected to the commonly connected emitters of said first and second transistors and to the commonly connected emitters of said third and fourth transistors;

a fifth differential transistor pair of ninth and tenth transistors having their emitters commonly connected, and their collectors connected to the commonly connected emitters of said first and second transistors and to the commonly connected emitters of said third and fourth transistors;

a sixth differential transistor pair of eleventh and twelfth transistors having their emitters commonly connected to the emitters of said seventh and eighth transistors, and their collectors connected to the collector of said fifth transistor and to the commonly connected emitters of said fifth and sixth transistors;

a seventh differential transistor pair of thirteenth and fourteenth transistors having their emitters commonly connected to the emitters of said ninth and tenth transistors, and their collectors connected to the commonly connected emitters of said fifth and sixth transistors and to the collector of said sixth transistor;

an eighth differential transistor pair of fifteenth and sixteenth transistors having their emitters commonly connected, and their collectors connected to the commonly connected emitters of said seventh and eighth transistors and to the commonly connected emitters of said ninth and tenth transistors;

a seventeenth transistor having its collector and emitter connected to the collector and emitter of said seventh transistor;

an eighteenth transistor having its collector and emitter connected to the collector and emitter of said eleventh transistor;

a ninteenth transistor having its collector and emitter connected to the collector and emitter of said thirteenth transistor;

a twentieth transistor having its collector and emitter connected to the collector and emitter of said tenth transistor;

means for applying a third input signal to the bases of said seventh, eleventh, ninteenth and twentieth transistors;

means for applying a fourth input signal to the bases of said tenth, thirteenth, seventeenth and eighteenth transistors;

means for applying a reference voltage to the bases of said eighth, ninth, twelfth and fourteenth transistors;

means for applying a fifth input signal to the base of said fifteenth transistor;

means for applying a sixth input signal, complementary to the fifth input signal, to the base of said sixteenth transistor; and a current source connected between the commonly connected emitters of said fifteenth and sixteenth transistors, and said second power source terminal.

5. A full adder circuit according to claim 4, further comprising:

a ninth differential transistor pair, connected between said current source and the commonly connected emitters of said fifteenth and sixteenth transistors, of twenty-first and twenty-second transistors having their emitters commonly connected, and their collectors connected to the collector of said fifteenth transistor and to the commonly connected emitters of said fifteenth and sixteenth transistors;

means for applying a seventh input signal to the base of said twenty-first transistor; and means for applying an eighth input signal, complementary to said seventh input signal, to the base of said twenty-second transistor.

6. A full adder circuit using paired differential transistors each having a base, emitter and collector, comprising:

first and second power source terminals across which is applied an operation voltage;

a first differential transistor pair of first and second transistors having their emitters commonly connected;

a second differential transistor pair of third and fourth transistors having their emitters commonly connected, and their collectors connected to the collectors of said first and second transistors, respectively;

a third differential transistor pair of fifth and sixth transistors having their emitters commonly connected;

a first resistor connected between said first power source terminal and the collectors of said first and third transistors;

a second resistor connected between said first power source terminal and the collectors of said second and fourth transistors;

a third resistor connected between the collector of said fifth transistor and said first power source terminal;

a fourth resistor connected between said power source terminal and the collector of said sixth transistor;

means for applying a first input signal to the bases of said first, fourth and fifth transistors;

means for applying a second input signal, complementary to said first input signal, to the bases of said second, third and sixth transistors;

a fourth differential transistor pair of seventh and eighth transistors having their emitters commonly connected, and their collectors connected to the commonly connected emitters of said first and second transistors and to the commonly connected emitters of said third and fourth transistors;

a fifth differential transistor pair of ninth and tenth transistors having their emitters commonly connected, and their emitters connected to the commonly connected emitters of said first and second transistors and to the commonly connected emitters of said third and fourth transistors;

a sixth differential transistor pair of eleventh and twelfth transistors having their emitters commonly connected to the emitters of said seventh and eighth transistors, and their collectors connected to the collector of said fifth transistor and to the commonly connected emitters of said fifth and sixth transistors;

a seventh differential transistor pair of thirteenth and fourteenth transistors having their emitters commonly connected to the emitters of said ninth and tenth transistors, and their collectors connected to the commonly connected emitters of said fifth and sixth transistors and to the collector of said sixth transistor;

an eighth differential transistor pair of fifteenth and sixteenth transistors having their emitters commonly connected, and their collectors connected to the commonly connected emitters of said seventh and eighth transistors and to the commonly connected emitters of said ninth and tenth transistors;

a seventeenth transistor having its collector and emitter connected to the collector and emitters of said fifteenth transistor, respectively;

a current source connected between the commonly connected emitters of said fifteenth and sixteenth transistors and said second power source terminal;

an eighteenth transistor having its collector and emitter connected to the collector and emitter of said seventh transistor, respectively;

a ninteenth transistor having its collector and emitter connected to the collector and emitter of said eleventh transistor, respectively;

a twentieth transistor having its collector and emitter connected to the collector and emitter of said thirteenth transistor, respectively;

a twenty-first transistor having its collector and emitter connected to the collector and emitter of said tenth transistor, respectively;

means for applying a third input signal to the bases of said seventh, eleventh, twentieth and twenty-first transistors;

means for applying a fourth input signal to the bases of said tenth, thirteenth, twenty-third and twenty-fourth transistors;

means for applying a fifth input signal to the base of said fifteenth transistor; means for applying a sixth input signal to the base of said seventeenth transistor;

means for applying a first reference voltage to the base of said sixteenth transistor; and means for applying a second reference voltage to the bases of said eighth, ninth, twelfth and fourteenth transistors.

* * * * *